United States Patent [19]

Koksbang

[11] Patent Number: 5,419,985
[45] Date of Patent: May 30, 1995

[54] ADDITIVE FOR ELECTRODE

[75] Inventor: Rene Koksbang, San Jose, Calif.

[73] Assignee: Valence Technology Inc., San Jose, Calif.

[21] Appl. No.: 248,640

[22] Filed: May 24, 1994

Related U.S. Application Data

[63] Continuation of Ser. No. 40,223, Mar. 30, 1993, abandoned.

[51] Int. Cl.⁶ .............................................. H01M 4/60
[52] U.S. Cl. .................................... 429/212; 252/500
[58] Field of Search ................ 204/291; 252/500, 506; 429/213, 212, 42

[56] References Cited

U.S. PATENT DOCUMENTS

| | | | |
|---|---|---|---|
| 4,060,674 | 11/1977 | Klemann et al. | 429/194 |
| 4,499,161 | 2/1985 | Foos | 429/196 |
| 4,804,594 | 2/1989 | Jow et al. | 429/213 |
| 4,830,939 | 5/1989 | Lee et al. | 429/192 |

OTHER PUBLICATIONS

R. T. Morrison et al, "Organic Chemistry", Second Edition, Jul. 1969, pp. 641–644.

Jerry March, "Advanced Organic Chemistry", Second Edition, pp. 344–346, 421, 435, 495, 811, 1187, 1313 no month or year available.

Primary Examiner—Kathryn Gorgos
Attorney, Agent, or Firm—Linda Deschere

[57] ABSTRACT

The invention provides an alkoxyl additive for use in electrodes or precursor pastes of such electrodes, where such additive is hydrolyzed to thereby take-up or remove any water in the precursor paste or electrode.

18 Claims, 2 Drawing Sheets

A.)

B.)

C.)

D.)

$RC(OR')_3$ >> $RCH(OR')_2$ >> $RCH_2OR'$
AN ORTHO ESTER    AN ACETAL    AN ETHER $R_2C(OR')_2$ > $RCH(OR')_2$ > $H_2C(OR')_2$
A KETAL    AN ACETAL    A FORMAL

ADDITIVE FOR ELECTRODE

This is a continuation of application Ser. No. 08/040,223 filed on Mar. 30, 1993, now abandoned.

FIELD OF THE INVENTION

This invention relates to electrodes of lithium-based electrochemical cells and batteries.

BACKGROUND OF THE INVENTION

In a battery or a cell utilizing a lithium containing electrode it is important to eliminate as many impurities as possible which may affect cell performance. Such impurities include water. More particularly, the rechargeability of a lithium metal foil electrode is limited by side reactions between metallic lithium and impurities, especially water. When water reacts with lithium there is formed a solid surface layer on the lithium which increases the impedance of the anode (negative electrode). Such surface layer is formed by consuming the active material lithium metal.

The surface layer formed by the reaction between lithium and water will have a detrimental effect on the subsequent stripping and replating of metallic lithium during cycling of the battery. These effects are most likely to be observed as relatively rapid formation of dendritic lithium powder. The reaction which forms dendritic lithium powder isolates the lithium powder both physically and electrically from the metallic anode body whereby the dendritic powder becomes electrochemically inactive for further use as an active material in the cell. The result is that the life cycle of the battery is reduced due to such undesired interaction with water. Such interactions may also occur when a lithium alloy or lithium containing compound is used. The source of water which causes such adverse reaction, may be from any component within the cell including components of the negative electrode, the positive electrode and the electrolyte. Therefore, prior to assembly of the completed cell, it is preferred that all water be eliminated. However, this is very difficult and often nearly impossible.

Although it is possible to remove water from the liquid electrolyte precursor components, such as by separation of liquid electrolyte precursors from water over molecular sieves, it is nearly impossible to eliminate or remove water from precursor electrode pastes, which are precursors to the active material of the anode (negative electrode) and cathode (positive electrode). Such electrode pastes contain carbon, active material and a polymer which is typically a binder or a combination of binder and electrolyte. These materials typically have high viscosities and cannot be simply dried by passage over molecular sieves. Typical active materials for electrodes include intercalation compounds, such as metal oxides, which releasably retain lithium during cyclic operation of the cell. The precursor paste contains volatile components such as precursors of the polymer binder electrolytes which are needed in the final product, and which undergo a solidification process and a polymerization process and cannot be heated prematurely. Therefore, it is not possible to simply remove water from the pastes by heating the precursor paste to a temperature approaching 100° C., the boiling point of water.

Therefore, what is needed is a method for removing water from constituents of an electrochemical cell or battery, and particularly from electrode compositions and precursors therefor.

SUMMARY OF THE INVENTION

The invention provides an organic compound (additive) which is relatively inexpensive and which may be easily included in electrode precursor pastes and/or the final electrode product of an electrochemical cell to readily take-up any water contained in the paste or the final electrode product. Such organic compound is selected based on its ability to undergo a hydrolysis reaction and because it readily volatilizes at a temperature considerably below the boiling point of water. This permits removal of the hydrolysis products without the necessity of raising the temperature of the precursor material to the point where polymerization of key precursor components takes place. The organic compound contains one or more alkoxyl groups (OR), where R designates a hydrocarbon. Such alkoxyl containing compound (additive) is hydrolyzed with any water present in the electrode composition, and typically forms an alcohol product. Typically, carbonyl product is also formed and it is often an aldehyde or a ketone. Preferably, the alkoxyl group (OR) is selected to provide alcohol and/or carbonyl products, each having a boiling point less than that of water, whereby it is possible to hydrolyze the water by formation of such products, and then remove such products with only a minor amount of heating and/or heating in combination with a vacuum. Desirably, the alkoxyl organic compound is a ketal, acetal or orthoester. Preferably, the alkoxyl organic compound has the general formula $(CH_3O)_nCR$, where n may be 1, 2 or 3, and where R represents hydrogen or an alkyl, and where each of the R constituents may be the same or different from one another. A particularly preferred composition is $(CH_3O)_3CH$.

Accordingly, the invention provides a composition for use in an electrode of a lithium battery or a precursor paste of such electrode which hydrolyzes with water, and forms a reaction product which is relatively inert with respect to the function of the active material in the electrode, and which is readily vaporized and removed at temperatures below the boiling point of water.

These and other objects, features and advantages will become apparent from the following description of the preferred embodiments, and accompanying drawings.

DETAILED DESCRIPTION OF THE PREFERRED EMBODIMENTS

Figure 1:
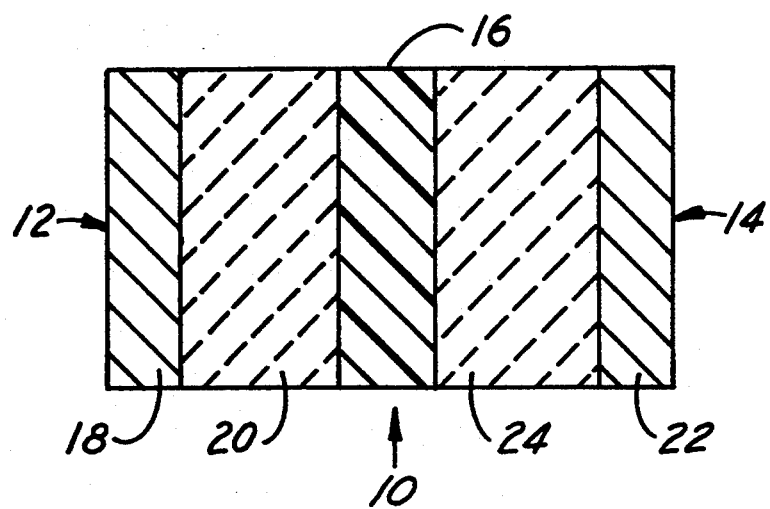
Fig. 1 is an illustration of a cross-section of a thin battery or cell embodying the invention.

As illustrated in FIG. 1, an electrochemical cell or battery 10 has a negative electrode side 12, a positive electrode side 14, and a separator 16 therebetween. In accordance with common usage, a battery may consist of one cell or multiple cells. The negative electrode is the anode during discharge, and the positive electrode is the cathode during discharge. The negative electrode side includes current collector 18, typically of nickel, iron, stainless steel, and/or copper foil, and a body of negative electrode active material 20. The negative electrode active material 20 is sometimes simply referred to as the negative electrode. The positive electrode side includes current collector 22, typically of aluminum, nickel, iron, stainless steel, and/or copper foil, or such foils having a protective conducting coating foil, and a body of positive electrode active material 24 which has as its main component one or more oxides of vanadium. The positive electrode active material 24 is sometimes simply referred to as the positive electrode. The separator 16 is typically a solid electrolyte, electrolyte separator. A suitable electrolyte separator (polymer electrolyte) is described in U.S. Pat. No. 4,830,939 incorporated herein by reference. The electrolyte separator is a solid organic polymer matrix containing an ionically conducting liquid with an alkali metal salt and the liquid is an aprotic polar solvent. The terms "solid electrolyte" and "electrolyte separator" are used interchangeably in industry. Sometimes, the term "separator" is used.

Negative electrodes (anodes) are typically made by mixing a binder/electrolyte with an active material such as metallized carbon or carbon powder particles, or in some cases, an oxide such as a transition metal intercalation compound. The binder/electrolyte composition may be a binder/electrolyte such as polymeric acrylates (plastics) which are x-linked (cross-linked) by radiation curing or may be based on conventional electrolyte/binder systems. The binder/electrolyte is preferably the polymeric acrylate (plastic) with ionic conduction capability. After mixing, the resulting paste is coated onto a current collector, such as a nickel foil with a roughened surface, and the polymer content is polymerized, and x-linked (cross-linked) by heat or radiation curing.

Positive electrodes (cathodes) are formed in a somewhat similar manner from a precursor paste. Such electrodes are prepared, for example, by mixing a cathode active material such as an intercalation oxide transition metal compound, (i.e. $V_6O_{13}$), a conductor such as carbon, and an electrolyte/binder. A typical cathode composition is as shown in Table 1. Cathode active material is often a transition metal chalcogen compound having a reversible lithium insertion ability, wherein the transition metal is at least one selected from the group consisting of Ti, V, Cr, Mn, Fe, Nb, Mo, Ta and W, and the chalcogen is at least one selected from the group consisting of O, S and Se.

TABLE 1

| Typical Cathode Composition | Percent by Weight |
|---|---|
| $V_6O_{13}$ (Active Material) | 45.2% |
| Carbon | 10.3% |
| Propylene Carbonate (PC) | 33.3% |
| PolyEthylene Oxide (PEO) | 1.0% |
| PolyEthyleneGlycolDiAcrylate (PEGDA) | 8.8% |
| TriMethylPolyEthylene Oxide TriAcrylate (TMPEOTA) | 1.5% |

Such cathode composition pastes are coated onto nickel foil, followed by electron beam curing (cross-linking/polymerization) of the acrylate component. Typically, an electrolyte is coated on top of the cathode and cured with ultra-violet light. In the case where a metallic lithium negative electrode is used, the lithium electrode may be applied on top of the electrolyte separator, and then the cell is finally assembled and placed in a flexible pouch and heat sealed under a vacuum.

One of the difficulties encountered in assembling such positive and negative electrodes is that water, as an essentially undesired impurity, unavoidably is included in the paste composition. By conventional electrode preparation techniques, it is nearly impossible to avoid the inclusion of water, and it is extremely difficult to remove the water without affecting physical and chemical characteristics of other components of the electrode composition. The electrode precursor paste composition typically contains volatile components which are needed in the final product, and other components which are used for the solidification process which will polymerize prematurely if heated to temperatures approaching the boiling point of water, that is, 100° C. Since such volatile components in the precursor paste are required to be maintained in the paste during the process of formation, such components are affected by any attempt to remove water at temperatures approaching 100° C., or any attempt to remove water under less than typical atmospheric pressure (i.e. in a vacuum), at less than 100° C.

The method of the invention provides a means by which water is quantitatively removed during formation of electrodes without affecting the composition of the electrode, and the process of formation thereof by quantitatively reacting water with a compound which contains at least one alkoxyl group (OR), where R designates an alkyl which may be the same alkyl or which may differ from the alkyl of any other alkoxyl group in the compound. The alkoxyl containing compound of the invention is included in the electrode precursor paste and hydrolyses with water, present in such paste, to form an alcohol (OH) product. Typically, carbonyl product is also formed, and it is often an aldehyde or a ketone. Preferably, the organic alkoxyl compound (additive) is selected to provide such alcohol and carbonyl products, each having a boiling point considerably less than that of water. It is desirable that the organic aloxyl compound (additive) be a ketal, acetal or orthoester.

The ketal additive may be characterized by the formula $R_2C(OR')_2$; the acetal additive may be characterized by the formula $RCH(OR')_2$; and the orthoester additive may be characterized by the formula $RC(OR')_3$.

In the above compound, R or R' may be a hydrocarbon radical selected from the group consisting of alkyl and cycloalkyl, including such radicals when inertly substituted. When R is alkyl, it may typically be methyl, ethyl, n-propyl, iso-propyl, n-butyl, 1-butyl, sec-butyl, amyl, octyl, decyl, octadecyl, etc. When R is cycloalkyl, it may typically be cyclohexyl, cycloheptyl, cyclooctyl, 2-methylcycloheptyl, 3-butylcyclohexyl, 3-methylcyclohexyl, etc. and R may be inertly substituted (i.e. it may bear a non-reactive substituent such as alkyl, cycloalkyl, ether, halogen, etc.) Typically inertly substituted R groups may include 3-chloropropyl, 2-ethoxyethyl, carboethoxymethyl, 4-methyl cyclohexyl, etc. The preferred R groups may be lower alkyl (i.e. $C_1$–$C_{10}$ alkyl), groups including e.g. methyl, ethyl, n-propyl, i-propyl, butyls, hexyls, octyls, decyls, etc. R may preferably be methyl. R' may preferably be methyl or ethyl.

Desirably, both R and R' are lower alkyl (i.e. $C_1$ to $C_{10}$), but more preferably $C_1$ to $C_4$ alkyl. Illustrative additives are dimethoxymethane, trimethoxymethane, dimethoxypropane, diethoxypropane and ethylorthoformate.

Preferably, the additive has the general formula $(CH_3O)_nCR$, where n may be 1, 2 or 3, and where R represents hydrogen or an alkyl, and where each of the R constituents may be the same or different from one another.

The products which are formed as a result of hydrolysis of the preferred alkoxyl compounds have lower boiling points and higher vapor pressure than that of water. Therefore, the products are very easily removed from the paste under conditions which do not affect the essential volatile components of the paste, and which do not result in premature solidification and polymerization. It is desirable that the amount of the alkoxyl compound that is added be at least equal to the amount of water which is to be removed. The typical cathode composition, as given in Table 1, is formed from a precursor paste of the components, and such pastes typically contain 30,000 ppm or 30 milli molars of water. Some portion of this water is removable by conventional means, but it is nearly impossible to remove the last 1,000 ppm (1 milli molar) of water, and to achieve a water content of less than 50 ppm in the paste. The alkoxyl additive of the invention is most useful to remove all or a portion of this last 1,000 ppm of water. The total amount of alkoxyl additive is thought to be effective if it constitutes as little as 1% by weight or 1 molar percent of the electrode precursor paste or electrode composition resulting from curing of such paste having the components as per Table 1. It is preferred that the additive constitute 0.1 to 2 milli molars of the paste. If the products of hydrolysis are not fully volatilized, they would also constitute an equivalent amount of the precursor paste or electrode composition. It may be useful to have some alkoxyl present after the cell is assembled, in the event that any water is present in any other component of the battery, such water will be removed by an equivalent hydrolysis reaction. It should be noted that some components of the battery may react with the additive or products of the hydrolysis reaction under some conditions, including conditions of battery operation. Therefore, it may be necessary to conduct the hydrolysis reaction and remove the products prior to final assembly or use of the battery. It is thought that the total amount of alkoxyl component of a battery corresponds to typically less than 5% by volume of the liquid aprotic electrolyte of such battery.

In one preferred embodiment of the invention, water in the precursor paste or any water present in the final assembled battery, is removed by reacting the water quantitatively with a compound (additive) such as $(CH_3O)_3CH$ (trimethoxymethane), the reaction is thought to proceed according to:

$$(CH_3O)_3CH + H_2O \rightarrow HCOOCH_3 + 2CH_3OH$$

As can be seen from the above equation, 1 mole of $(CH_3O)_3CH$ reacts with 1 mole of water. The products of the reaction are methylformate and methanol. These two compounds have significantly lower boiling points (32° C. and 65° C. respectively) than water and it is therefore possible to remove these compounds under vacuum, without heating, at a temperature of 30°–40° C. Since the volatile compounds and the polymer precursors in the electrolyte component of the electrodes are stable in this temperature range, simple vacuum/heat methods can be used to reduce the water content of the final battery.

In general, the hydrolysis reaction described above for $(CH_3O)CH$ is similar for vinyl ethers, acetals and similar compounds, such as orthoesters, acetals and formals as shown below to form alcohol ROH products, and typically, carbonyl products (C=O). See FIG. 2 reactions A, B, C and D.

It is known that in compositions A through D the alkoxyl group OR is not a leaving group, and so these compounds are converted to the conjugate acid before hydrolysis. In some cases, a higher acid concentration is required than in others. However, in the case of acetals, ketals and orthoesters, these are easily cleaved by relatively neutral to acidic conditions, that is, preferably, pH of 7 or below 7. It is preferred to have the pH low enough to catalyze the reaction of acetal or ketal or orthoester with water: typically a pH below 7 and commonly 1–6.5 with a preferred range of about 5 and below 7. These compounds are hydrolyzed with ease since carbonium-ions of the RO—C—type are involved.

Figure 3A:
FIG. 3(A)–(B) show the relative ease of hydrolysis of various alkoxyl compounds.
Figure 3B:
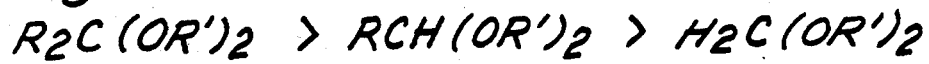

The acetal hydrolysis reaction is essentially the reverse of that for acetal formation by reaction of an aldehyde in an alcohol. These reactions proceed easily in the presence of water. It is known that hydrolysis rates greatly increase in the order of $CH_2(OR)_2 < RCH(OR)_2 < R_2C(OR)_2 < RC(OR)_3$, as would be expected for a carbonium-ion intermediate. Although acetals, ketals and orthoesters are easily hydrolyzed by relatively acidic or nearly neutral conditions, they are extremely resistant to hydrolysis in very basic conditions. The ease of hydrolysis of various alkoxyl containing compounds are as shown in FIGS. 3(a) and 3(b).

Based on the ease of hydrolysis of the alkoxyl components given above, it is obvious that an additive of the general formula $RC(OR)_3$ is very easily hydrolyzed and, therefore, very easily and readily takes-up or removes water to form alcohol and carbonyl containing products. The next readily hydrolyzed alkoxyls are ketals of the formula $R'_2C(OR)_2$ and $R'CH(OR)_2$. It is desired that the simplest alkoxyls be used where the OR group of the orthoester or ketal is represented by the formula $OCH_3$, and the R' represents hydrogen or a low alkyl group, such as a methyl group. These simple alkoxyl compounds are exemplified by polymethoxyethers of the general formal $(CH_3O)_nCR$, where n is 2 or 3 and R is hydrogen and an alkyl. When three alkoxyl groups $(CH_3O)$ are included it is a trimethoxymethane, and when two $(CH_3O)$ groups are included, it is designated as dimethoxymethane.

In summary, the ketals or acetals or orthoesters function by reacting with the water thereby forming alcohols. Thus, the additives remove the water and also form alcohols which are relatively inert with respect to the electrode components and function of the electrode. When the additives contain methyl or ethyl groups, the resultant alcohols formed are methanol and ethanol, and these are readily vaporized and removed at temperatures well below 100° C.

When the water to be removed from the electrode is in the parts per million level, then the alkoxyl compound is added to equal only a minor amount sufficient for removal of water. It may be feasible, in some instances, to actually measure or closely estimate the amount of water to be removed, and closely match the quantity of alkoxyl required. However, it is convenient to simply estimate the amount of such alkoxyl compound to add, and then ensure that an excess amount is included. Typically, an excess amount will result in such alkoxyl compound constituting no more than about 5% by volume of such compound in the combined volume of additive and liquid aprotic electrolyte of the final assembled cell.

Figure 2:
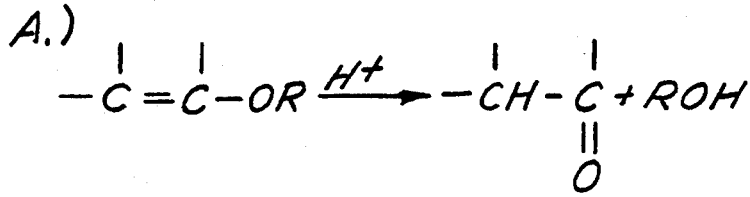
FIG. 2 shows typical hydrolysis reactions for alkoxyl compounds.
Figure 2:
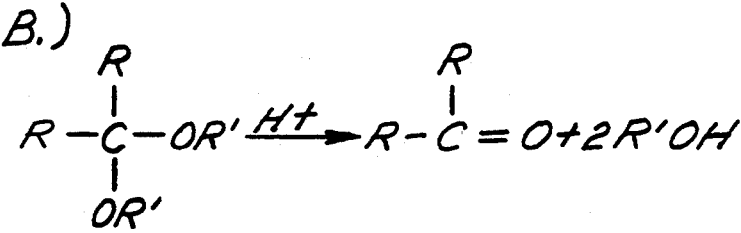
Figure 2:
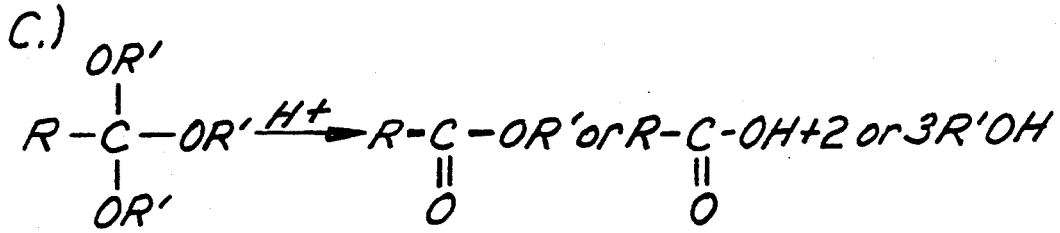
Figure 2:
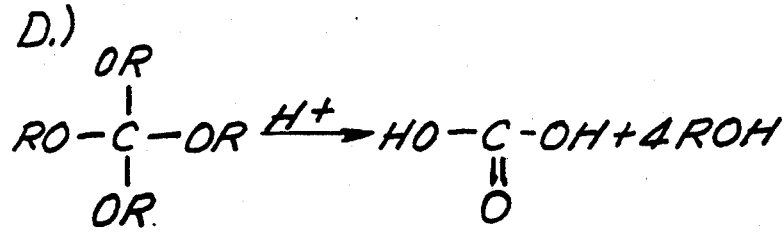

As described earlier, the composition of the invention comprises "a compound which contains at least one alkoxyl group (OR), where R designates an alkyl which may be the same alkyl or which may differ from the alkyl of any other alkoxyl group in the compound". Therefore, compounds of the invention contain at least one (OR) group, such as $(CH_3O)_n$ where n is at least 1. It was also described that ketal additives may be characterized by the formula $R_2C(OR')_2$; the acetal by $RCH(OR')_2$; and the orthoester by $RC(OR')_3$. These compositions correspond to $(CH_3O)_nCR_p$ where n is at least 1 and n is 1, 2 or 3. Correspondingly, p is 1, 2 or 3. Compounds containing at least one (OR) group are exemplified by $(CH_3O)_nCR_p$ where n is 1 and p is 3, n is 2 and p is 2, and where n is 3 and p is 1. Those skilled in the art will appreciate that these values for n and p occur because the central carbon atom has its typical 4 bond capability so that the total number of substituents off the central carbon will be 4. The ease of hydrolysis was described earlier. There is an order of ease of hydrolysis, as a result, the invention is described in its preferred mode as $(CH_3O)_nCR$ where n is 2 or 3, and correspondingly, the number of R groups is 2 when n is 2 or 1 when n is 3. In FIG. 2 exemplary representations of the preferred compositions are as shown. In can be seen in FIG. 2 A, B, C, and D that the central carbon atom is attached to 4 other groups. In Figures B, C, and D the total number of groups attached to the central carbon is 4. Further, as shown in FIG. 2D the value of n itself may equal 4 where the compound contains all (OR) groups attached to the central carbon. Those skilled in the art will appreciate that in a broad aspect, compounds of the invention have the more broad general formula $(OR)_nCR_p$ where n is 1, 2, 3 or 4 and where p is 0, 1, 2 or 3, and where the sum of n plus p is 4.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

I claim:

1. An electrode composition or precursor paste thereof which comprises an active material and one or more alkoxyl compounds which hydrolyze and selected from the group consisting of ketals, acetals orthoesters, methoxyethers and polymethoxyethers.

2. The electrode composition according to claim 1, wherein the alkoxyl compounds are present in an amount less than about 1% by weight of the electrode composition or precursor thereof.

3. An electrode composition or precursor paste thereof which comprises an active material and an alkoxyl compound which hydrolyzes and is represented by the general formula $(CH_3O)_3CH$.

4. The electrode composition according to claim 3, wherein the alkoxyl compounds are present in an amount less than about 1% by weight of the electrode composition or precursor thereof.

5. An electrode composition or precursor paste thereof which comprises an active material and at least one reaction product of water and an alkoxyl compound which hydrolyzes and is selected from the group consisting of ketals, acetals, orthoesters, methoxyethers and polymethoxyethers; where one or more of said at least one reaction product is selected from the group consisting of alcohols, carbonyls and mixtures thereof.

6. The electrode composition or precursor paste thereof according to claim 5, wherein the alkoxyl compounds are present in an amount less than about 1% by weight of the electrode composition or precursor thereof.

7. An electrode composition or precursor paste thereof which comprises an active material and at least one reaction product of water and an alkoxyl compound which hydrolyzes and is represented by the general formula $(CH_3O)_3CH$ where one or more of said at least one reaction product is selected from the group consisting of alcohols, carbonyls and mixture thereof.

8. The electrode composition or preecursor paste thereof according to claim 7, wherein the alkoxyl compounds are present in an amount less than about 1% by weight of the electrode composition or precursor thereof.

9. The electrode composition according to claim 7, wherein said alcohol is $CH_3OH$ and said carbonyl is $HCOOCH_3$.

10. A cathode which is used for an electrochemical cell, said cathode comprising an electrode composition or recursor paste thereof which comprises an active material and one or more alkoxy compounds which hydrolyze and selected from the group consisting of ketals, acetals, orthoesters, methoxyethers and polymethoxyethers.

11. A cathode which is used for an electrochemical cell, said cathode comprising an electrode composition or precursor paste thereof which comprises an active material and an alkoxyl compound which hydrolyzes and is represented by the general formula $(CH_3O)_3CH$.

12. A cathode which is used for an electrochemical cell, said cathode comprising an electrode composition or precursor paste thereof which comprises an active material and one or more reaction products of water and an alkoxy compound which hydrolyzes and is selected from the group consisting of ketals, acetals, orthoesters, methoxyethers, and polymethoxyethers; where at least one of said one or more reaction products is selected from the group consisting of alcohols, carbonyls, and mixtures thereof.

13. A cathode which is used for an electrochemical cell, said cathode comprising an electrode composition or precursor paste thereof which comprises an active material and one or more reaction products of water and a alkoxyl compound which hydrolyzes and is represented by the general formula $(CH_3O)_3CH$ where at east one of said one or more reaction products is selected from the group consisting of alcohols, carbonyls, and mixtures thereof.

14. The electrode composition according to claim 13 wherein said alcohol is $CH_3OH$ and said carbonyl is $HCOOCH_3$.

15. An electrode composition or precursor paste thereof which comprises an active material and one or more alkoxyl compounds which hydrolyze and selected from the group consisting of ketals, acetals orthoesters, methoxyethers and polymethoxyethers; wherein each of the alkoxyl compounds has the general formula $(CH_3O)_nCR'_p$ where n is 1, 2 or 3, p is 1, 2 or 3, and where $R'$ represents hydrogen or an alkyl.

16. The electrode composition or precursor paste thereof of claim 15 wherein when n is 1, p is 3; when n is 2, p is 2; and when n is 3, p is 1.

17. An electrode composition or precursor paste thereof which comprises an active material and at least one reaction product of water and an alkoxyl compound which hydrolyzes and is selected from the group consisting of ketals, acetals, orthoesters, methoxyethers and polymethoxyethers; where said at least one reaction product is selected from the group consisting of alcohols, carbonyls and mixtures thereof; and wherein said alkoxyl compound has the general formula $(CH_3O)_n CR'_p$, where n is 1, 2 or 3, p is 1, 2 or 3, and R' represents hydrogen or an alkyl.

18. The electrode composition or precursor paste thereof of claim 17 wherein when n is 1, p is 3; when n is 2, p is 2; and when n is 3, p is 1.

* * * * *